United States Patent [19]

Funakoshi et al.

[11] Patent Number: 4,775,438
[45] Date of Patent: Oct. 4, 1988

[54] PROCESS FOR PEELING PROTECTIVE FILM OFF A THIN ARTICLE

[75] Inventors: Keigo Funakoshi; Kozo Nomura; Minoru Ametani; Kenji Ohnishi, all of Ibaraki, Japan

[73] Assignee: Nitto Electric Industrial Co., Ltd., Osaka, Japan

[21] Appl. No.: 917,236

[22] Filed: Oct. 7, 1986

Related U.S. Application Data

[63] Continuation of Ser. No. 617,863, Jun. 6, 1984, abandoned.

[51] Int. Cl.⁴ ............................ B44C 1/17; B32B 31/00
[52] U.S. Cl. .................................... 156/241; 156/230; 156/249; 156/344
[58] Field of Search ............... 156/344, 230, 238, 241, 156/249, 289, 584, 239, 248, 235, 254, 255

[56] References Cited

U.S. PATENT DOCUMENTS

| | | | |
|---|---|---|---|
| 4,029,536 | 6/1977 | Kovacs et al. | 156/285 |
| 4,285,759 | 8/1981 | Allen et al. | 156/344 |
| 4,421,586 | 12/1983 | Bargman | 156/584 |
| 4,466,852 | 8/1984 | Beltz et al. | 156/344 |
| 4,508,589 | 4/1985 | Tarui et al. | 156/344 |

Primary Examiner—Michael W. Bell
Assistant Examiner—Louis Falasco
Attorney, Agent, or Firm—Armstrong, Nikaido, Marmelstein & Kubovcik

[57] ABSTRACT

A process for peeling a protective film off a thin article such as a silicon wafer is proposed. The film is peeled by sticking an adhesive tape to the protective film on the article and pulling it away from the article. The protective film is peeled only by the adhesive force of the adhesive tape.

1 Claim, 3 Drawing Sheets

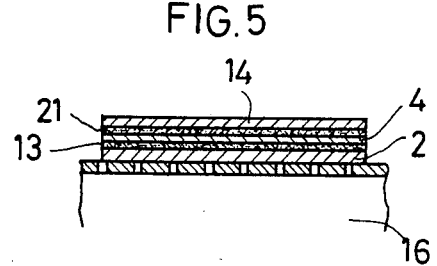
FIG. 5
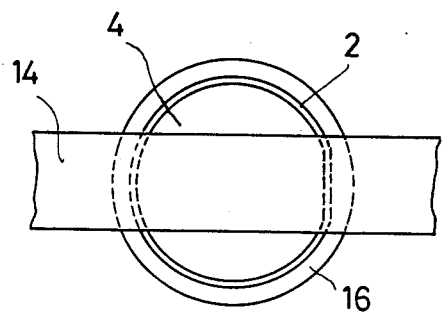
FIG. 6
FIG. 7
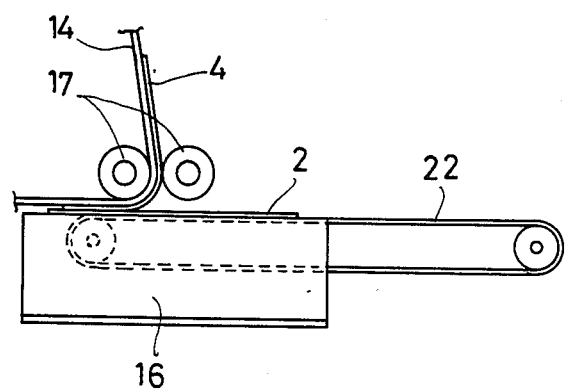
FIG. 8
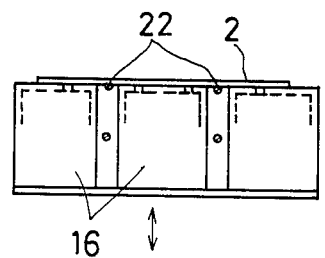

PROCESS FOR PEELING PROTECTIVE FILM OFF A THIN ARTICLE

This application is a continuation of application Ser. No. 617,863 filed June 6, 1984, now abandoned.

The present invention relates to a process and an apparatus for peeling an adhesive protective film stuck to one side of a thin article such as silicon wafers.

In the production of silicon wafers, a protective film is stuck to one side of the wafer for protection. After the other side of the wafer has been lapped by water flow and processed otherwise, the protective film has to be peeled. This peeling work has so far been done manually. So it was very troublesome and inefficient.

An object of the present invention is to provide a process and an apparatus for efficiently peeling a protective film off a thin article.

The process according to the present invention is characterized in that the protective film is peeled off the article by sticking an adhesive tape to the protective film on the article and removing the adhesive tape away from the article. The protective film is easily peeled off the article only by the adhesive force of the adhesive tape simply by pulling the adhesive tape off the article.

In accordance with the present invention, the adhesive tape is stuck to the protective film on the article by pressing the former against the latter and is removed from the article by pulling the adhesive tape while applying suction to the article to hold it in position.

Other objects and features of the present invention will become apparent from the following description taken with reference to the accompanying drawings, in which:

FIG. 5 is an enlarged vertically sectional view of an article with the protective film having an adhesive tape stuck thereto;

FIG. 6 is a plan view of the vacuum suction unit with the article mounted thereon;

FIG. 7 is a sectional front view showing another example of the suction unit and the belt conveyor; and FIG. 8 is a side view of the same.

Figure 1:
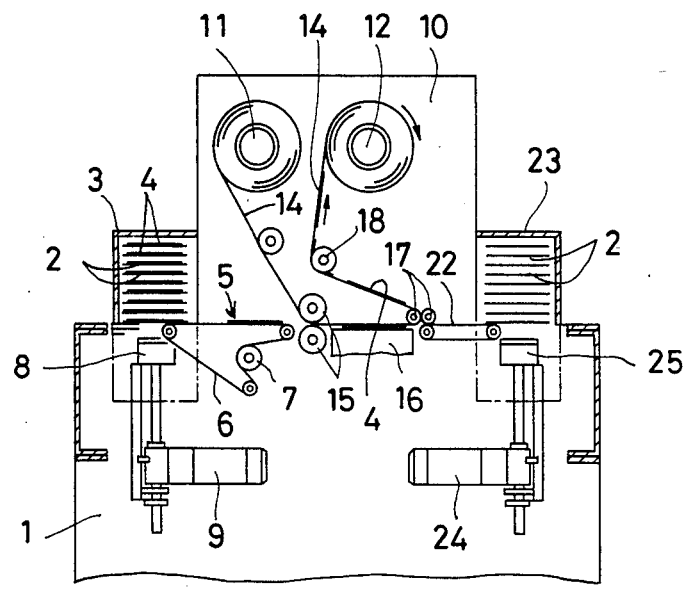
FIG. 1 is a partially sectional front view of the apparatus for carrying out the process according to the present invention.

Referring to FIG. 1, a machine body 1 has a magazine in which a lot of thin articles 2 such as silicon wafers are stacked one upon another. A protective adhesive film 4 has been stuck to the upper side of each article 2. Means 5 for taking the articles out of the magazine comprise an endless conveyor belt 6 driven by a motor (not shown) and a driving pulley 7. A magazine support 8 is lowered at a regular pitch by an elevator 9 to put the articles 2 on to the endless belt 6 one after another.

Figure 2:
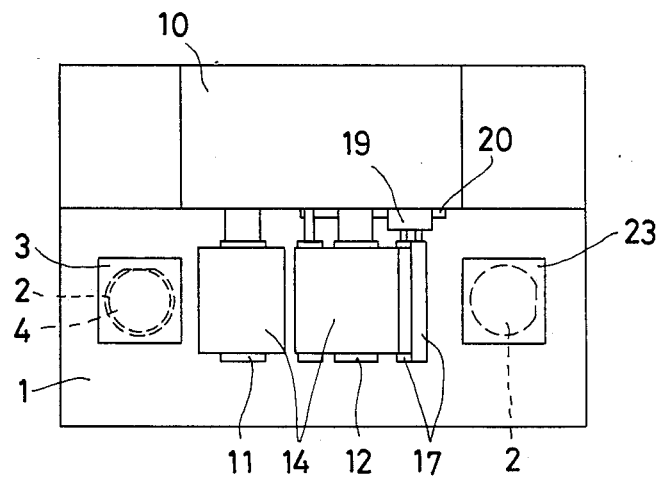
FIG. 2 is a plan view of the same.

On one side of a box 10 provided at the side of the machine body 1, a pair of spindles 11, 12 are mounted. (FIG. 2) A web of adhesive tape 14 is wound on the spindle 1, and the spindle 12 serves to take it up. The spindle 11 is provided with a brake and the spindle 12 is provided with a drive.

When the article 2 with the protective film 4 and the adhesive tape 14 pass between a pair of press rollers 15, the adhesive tape 14 with its adhesive side facing down sticks to the protective film 4 on the article 2. In front of the press rollers 15, there is a vacuum suction unit 16 which is a hollow box having a plurality of suction holes in its upper surface and connected to a vacuum pump (not shown) through a valve. (FIG. 5)

Figure 3:
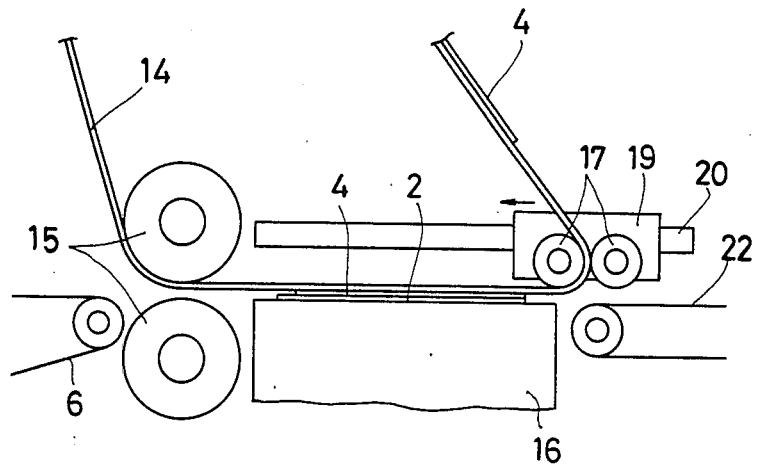
FIGS. 3 and 4 are enlarged front views showing how the protective film is peeled.

The adhesive tape 14 then passes between a pair of peeling rollers 17 up and around a guide roller 18 and is taken up around the spindle 12. The peeling rollers 17 are mounted on a carriage 19 (FIGS. 3 and 4) slidably mounted on a guide rail 20 and adapted to be driven by an air cylinder or a motor-driven feed screw (not shown).

When the article 2 is fed by the conveyor belt 6 into between the press rollers 15 and gets on the suction unit 16, the spindles 11 and 12 and the press rollers 15 will stop. Now, the adhesive tape 14 with an adhesive layer 21 has been stuck to the protective film 4 stuck to the article 2 with an adhesive layer 13. (FIG. 5)

Figure 4:
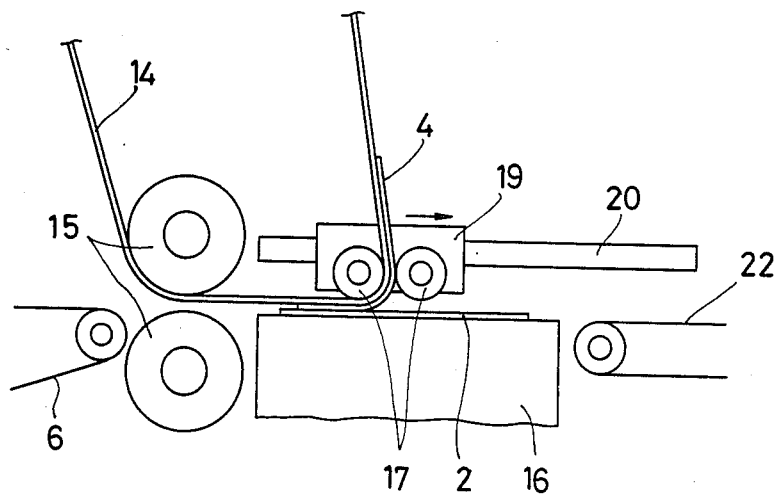

The suction unit 16 starts suction by vacuum to hold the article 2 on to the suction unit 16. Then only the spindle 12 starts turning in the direction of arrow in FIG. 1 whereas the spindle 11 is prevented from turning by its brake. Simultaneously the carriage 19 starts to move in the direction of arrow on FIG. 3, so that the protective film 4 is peeled off the article 2 by the adhesive tape, as shown in FIG. 4. The rollers 17 may be driven as the carriage 19 move.

When the protective film 4 has been almost peeled off the article 2 as shown in FIG. 4, the spindle 11 is released from braking and the vacuum suction is stopped. The carriage 19 is moved in the direction of arrow on FIG. 4 while the adhesive tape 14 is taken up around the spindle 12. The article 2 will be moved in the same direction by the protective film 4 which has been almost peeled by the adhesive force of the adhesive tape 14. The article 2 will transfer to a next endless conveyor belt 22. The protective film 4 will be completely peeled off and be taken up around the spindle 12 together with the adhesive tape 14.

The suction unit 16 may comprise a plurality of units arranged side by side with the rear portions of the conveyor belts 22 disposed between these suction units (FIGS. 7 and 8) so that the articles 2 with the protective films 4 peeled will be carried away by the conveyor belts 22. In this case, the suction units 16 may be adapted to be lowered when the article 2 has come over the belts 22. This ensures that the article 2 will be transferred on to the belts 22.

The adhesive tape 14 may be narrower than the width of the article 2, as shown in FIG. 6.

The articles 2 with the protective films 4 peeled are fed by the conveyor belt 22 into the next magazine 23, which is of a similar construction to the magazine 3. Each time the article 2 is inserted into the magazine 23, a support 25 driven by an elevator 24 is adapted to be raised by one pitch.

While the carriage 19 having the peeling rollers 17 is moving in the direction of arrow in FIG. 4, the conveyor belt 6 is driven to feed the next article 2 into between the press rollers 15.

In the preferred embodiment, by repeating the above-said steps, the articles 2 are processed one after another to peel the protective film 4. The film-peeled articles 2 are contained in the magazine 23. The films 4 peeled off the articles are taken by the adhesive tape 14 which is taken up by the spindle 12. This makes it possible to peel the protective films off the articles efficiently and almost automatically.

What is claimed is:

1. Process for removing a protective adhesive film stuck by an adhesive layer to one side of a thin article such as a silicon wafer comprising the steps of pressing a web of adhesive tape along an entire length of said protective film on the article, said web of adhesive tape extending from said article through a pair of rollers to a take-up spindle where one end of said web of adhesive tape is wound, holding said article against movement and removing said protective film from one end to the other by rotating said take-up spindle and moving said pair of rollers parallel to the surface of said article to remove said web of adhesive tape and peel said protective film off the article by the adhesive force of said adhesive tape.

* * * * *